(12) United States Patent
Mosby

(10) Patent No.: US 10,259,290 B2
(45) Date of Patent: Apr. 16, 2019

(54) SKYLIGHT VENT COVER

(71) Applicant: Gordon E. Mosby, Tracy, CA (US)

(72) Inventor: Gordon E. Mosby, Tracy, CA (US)

( * ) Notice: Subject to any disclaimer, the term of this patent is extended or adjusted under 35 U.S.C. 154(b) by 331 days.

(21) Appl. No.: 15/005,979

(22) Filed: Jan. 25, 2016

(65) Prior Publication Data

US 2017/0210205 A1 Jul. 27, 2017

(51) Int. Cl.
*B60H 1/00* (2006.01)
*B60H 1/26* (2006.01)
*B60H 1/24* (2006.01)
*B60J 7/16* (2006.01)
*B60P 3/36* (2006.01)

(52) U.S. Cl.
CPC .............. *B60H 1/262* (2013.01); *B60H 1/245* (2013.01); *B60J 7/1642* (2013.01); *B60P 3/36* (2013.01); *B60H 1/00364* (2013.01)

(58) Field of Classification Search
CPC .......... F24F 7/02; B60H 1/245; B60H 1/262; B60H 1/1642
USPC ............... 454/129, 136, 199, 2, 4–7; 52/200
See application file for complete search history.

(56) References Cited

U.S. PATENT DOCUMENTS

| | | | |
|---|---|---|---|
| 2,211,367 A * | 8/1940 | Davey | F24F 7/02 |
| | | | 454/107 |
| 4,300,440 A * | 11/1981 | Holter | B60J 7/1642 |
| | | | 114/201 R |
| 4,762,160 A | 8/1988 | Bechtold | |
| 4,770,087 A * | 9/1988 | Danley | E06B 3/485 |
| | | | 160/92 |
| 6,289,834 B1 | 9/2001 | Phillips | |
| 6,385,922 B1 * | 5/2002 | Mors | E04D 13/03 |
| | | | 52/173.3 |
| 6,468,147 B1 | 10/2002 | Thomas | |
| 2002/0051297 A1 | 5/2002 | Hoy et al. | |
| 2007/0024094 A1 | 2/2007 | Varga | |

(Continued)

FOREIGN PATENT DOCUMENTS

FR 2960246 A1 11/2011

OTHER PUBLICATIONS

Website, http://sportsmansguide.com/product/index/camco/sunshield-rv-vent-cover?a=760550, Camco® Sunshield™ RV Vent Cover, four sheets printed from the Internet on Jun. 30, 2015.

*Primary Examiner* — Vivek K Shirsat
(74) *Attorney, Agent, or Firm* — Richard C. Litman

(57) ABSTRACT

The skylight vent cover is installed immediately beneath the existing skylight in the ceiling of a structure, e.g., motorhomes, cabin boats, etc. The vent cover includes one or more opaque panels that are spaced away from the overlying structure to substantially block light passage while allowing airflow between the panel(s) and overlying structure. Some embodiments have a single planar or non-planar panel. Other embodiments have a plurality of tiered panels. The upper surface(s) of the panel(s) can have a reflective coating thereon to reflect light and heat from the skylight and vent. Various attachments can be provided, e.g., mating hook and loop material, magnets, hinge and latch, etc. In all embodiments, the panel is spaced away from the overlying ceiling structure, and in the case of multiple panel embodiments, the panels are spaced apart from one another to provide good ventilation and airflow therebetween.

20 Claims, 4 Drawing Sheets

(56) References Cited

U.S. PATENT DOCUMENTS

| | | | |
|---|---|---|---|
| 2008/0184635 A1* | 8/2008 | Nemazi | B29C 70/76 |
| | | | 52/200 |
| 2011/0056135 A1 | 3/2011 | Cochran, Jr. | |
| 2012/0134170 A1 | 5/2012 | Bracale | |
| 2014/0226351 A1 | 8/2014 | Hernandez et al. | |
| 2015/0087216 A1 | 3/2015 | Stover et al. | |

* cited by examiner

SKYLIGHT VENT COVER

BACKGROUND OF THE INVENTION

1. Field of the Invention

The present invention relates generally to ventilated covers, closures, and the like, and particularly to a skylight vent cover for installation beneath an overhead skylight for allowing airflow therethrough while blocking direct light passage.

2. Description of the Related Art

Skylights and/or other transparent or translucent panels are well known in many structures. A prime example is the conventional skylight commonly installed in many recreational and other vehicles, such as trailers, motorhomes, cabin boats, etc. Such skylights serve to allow light to enter an otherwise poorly lighted interior, and most such skylights can be opened to provide ventilation as well.

However, many such skylights do not include any means for blocking light passage therethrough. This may not ordinarily be a problem, but there are times when darkness is preferred, such as early morning hours at and immediately following sunrise. This is particularly critical during the summer, when the sun rises comparatively early. The sunlight passing through such a skylight can be quite disruptive to one's sleep when the skylight is installed over a bedroom area.

Accordingly, there have been various devices developed for installation with skylights to block light passage through the skylight. An example of such is a soft cushion-like device that is stuffed into the skylight opening immediately below the skylight. Such a device serves well to prevent light passage into the interior of the structure, but it also blocks airflow through the skylight even though the skylight may be open. This can be important to the comfort of those residing in the structure, particularly on warm summer evenings if such a device is installed in the vent just before bedtime in order to prevent disruption of sleep at sunrise the next morning.

Thus, a skylight vent cover solving the aforementioned problems is desired.

SUMMARY OF THE INVENTION

The skylight vent cover comprises several embodiments, each structured to substantially block light passage through a skylight while simultaneously providing airflow through the vent cover. A first embodiment comprises a single flat, opaque sheet of material that can be removably installed to the ceiling of a structure beneath an overlying skylight. The panel is spaced away from the overlying structure to permit airflow between the overlying structure and the cover.

A second embodiment comprises a plurality of tiered panels, each successively lower panel being smaller than the next panel above. The uppermost panel is spaced away from the overlying ceiling and skylight structure. The panels therebelow are spaced away from the next overlying panel to provide for ventilation. A third embodiment is similar to the second embodiment, but all of the panels have the same external dimensions.

Fourth and fifth embodiments comprise single opaque panels, but the panels are non-planar. In the fourth embodiment, the panel is configured as a depending dome beneath the overlying skylight. In the fifth embodiment, the panel is configured in an inverted gabled or pyramid shape.

In a sixth embodiment, a single panel is attached to the overlying structure by a hinge or hinges at one edge, and a latch at the opposite edge. This permits the panel to be opened as desired. All skylight vent cover embodiments are spaced away from the overlying structure, and the panels of multiple-panel embodiments are spaced from one another to provide airflow therebetween. The panels may be attached to one another and to the overlying structure by mating hook and loop material, e.g., Velcro®, magnets, mechanical attachments, etc. The upper surface or surfaces of the panel or panels can be provided with a reflective surface to further deflect light and heat. The lower surface or surfaces of the panel or panels can be provided with a decorative coating or display.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
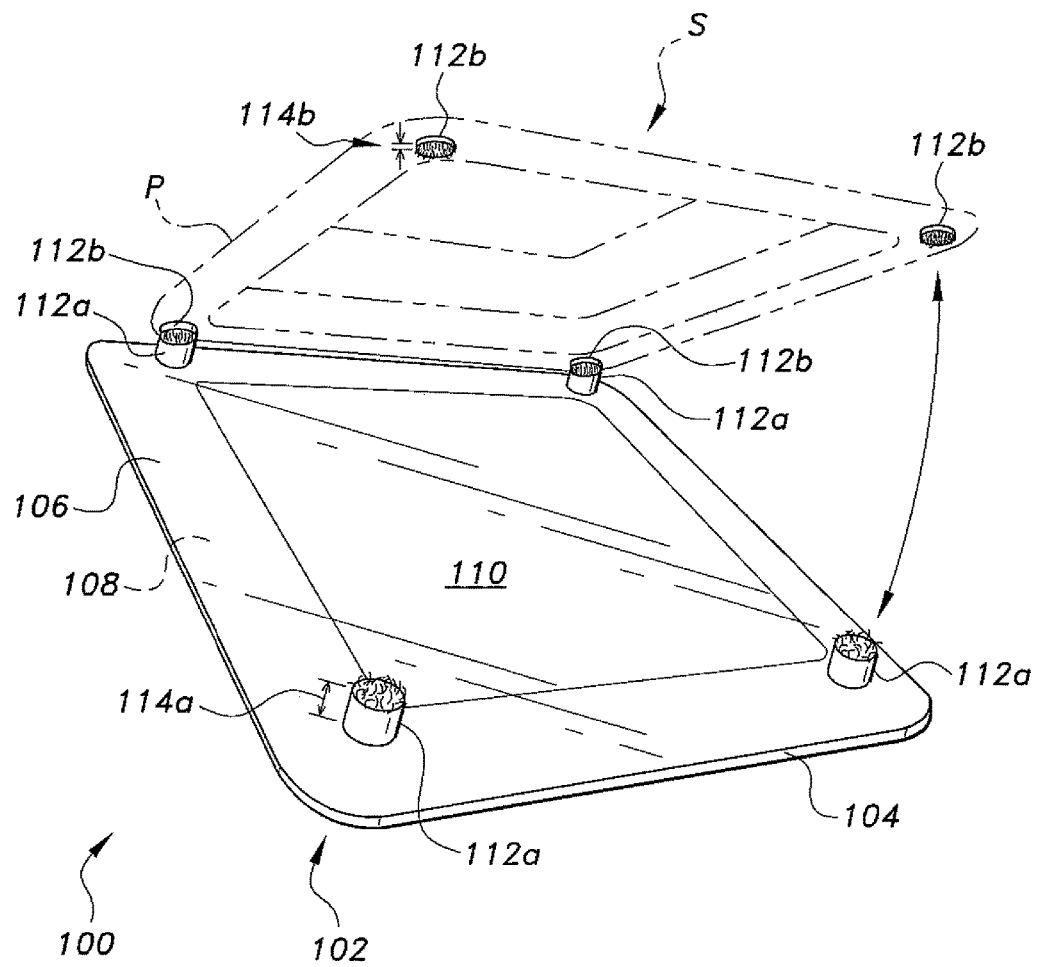
FIG. 1 is an environmental, perspective view of a first embodiment of a skylight vent cover according to the present invention, showing the vent cover in an open configuration.
Figure 2:
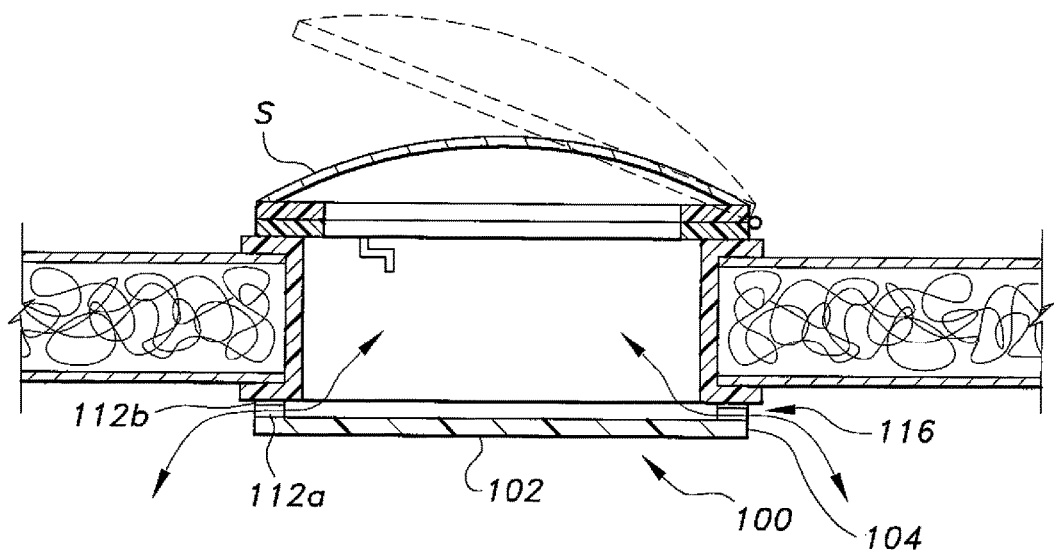
FIG. 2 is an environmental side elevation view in section of the skylight vent cover of FIG. 1, showing the vent cover in a closed configuration.

The skylight vent cover comprises several embodiments, each of which is configured to substantially block or impede light passage therethrough while allowing airflow for ventilation. FIGS. 1 and 2 respectively provide an environmental perspective view and an elevation view in section of a first embodiment of a skylight vent cover, designated as skylight vent cover, vent cover, or cover 100. The cover 100 comprises a single rigid, opaque panel 102 having a periphery 104 configured to overlap the periphery P of the overlying skylight S. The panel 102 further has an upper surface 106, i.e., the surface facing toward the skylight S when the panel 102 is installed therebelow, and a lower surface 108 that faces toward the interior of the structure when the panel 102 is installed. The upper surface 106 may have a reflective coating 110 thereon, e.g., a mirror, polished metal, etc., to reflect light and heat away from the panel 102 when installed. While the panel 102 shown in section in FIG. 2 is indicated to be formed of a plastic material, it should be noted that any suitable opaque sheet material, e.g., wood, metal, plastic, etc. may be used to form the panel 102.

A plurality of first attachments 112a is permanently affixed to the upper surface 106 of the panel 102 adjacent the periphery 104 thereof. A corresponding plurality of second attachments 112b of cooperating material is permanently affixed adjacent the periphery P of the skylight S. The second attachments 112b are in registry with corresponding ones of the first attachments 112a when the panel 102 is installed beneath the skylight S. In the example of FIGS. 1 and 2, the attachments 112a and 112b comprise mating pads of hook and loop material (Velcro®). Each of the pads has some height or thickness 114a, 114b, which results in there being a peripherally disposed air or ventilation passage 116 between the panel 102 and the overlying skylight S when the panel 102 is installed therebelow, as shown in FIG. 2. This allows airflow to flow through the air or ventilation passage 116 and into or out from the skylight S when the skylight cover 100 has been opened, as shown in broken lines in FIG. 2. The ventilation passage 116 can be expanded by adding additional height or thickness to either or both of the attachments 112a and/or 112b in the form of spacers or the like. Yet the opaque nature of the panel 102 blocks any light passage therethrough, so that only a small amount of diffused light passes through the air or ventilation passage 116 when the panel 102 is installed beneath the skylight S. The use of mating hook and loop material for the first and second attachments 112a and 112b provides the further advantage that the mating attachments need not be in perfect alignment with one another. This allows the mating attachments 112a, 112b at one edge of the skylight vent cover 100 to be disengaged with one another while the attachments 112a, 112b at the opposite edge remain attached to one another, thus somewhat mimicking a hinge structure to allow the cover 100 to be opened from one edge, as shown in FIG. 1.

Figure 3:
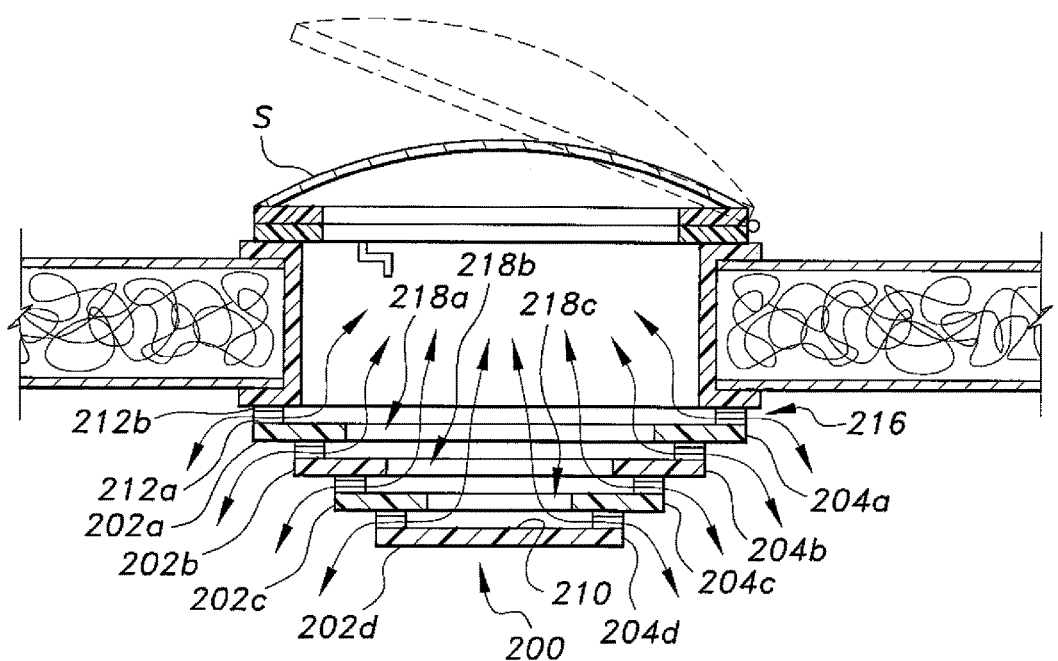
FIG. 3 is a side elevation view of a second embodiment of the skylight vent cover according to the present invention, wherein the vent cover comprises multiple tiered panels.

FIG. 3 illustrates a second embodiment skylight vent cover, designated as cover 200. Rather than comprising only a single panel, the skylight vent cover 200 of FIG. 3 comprises a series of tiered panels having at least one upper panel (in this case three such panels 202a, 202b, and 202c) and a lowermost panel 202d. Each of the panels 202a through 202d has a progressively smaller periphery than the preceding panel, i.e., the uppermost panel 202a has the largest periphery 204a, and each successive panel 202b through 202d has a smaller periphery 202b through 202d than the preceding panel immediately above. Each of the panels 202a through 202d is attached to the next adjacent panel by suitable mating attachment means 212a and 212b, e.g., mating hook and loop fastener material as in the embodiment 100 of FIGS. 1 and 2, or alternatively, mating magnets or mechanical attachments (snaps, etc.). The thickness of these mating attachments 212a, 212b defines a series of air or ventilation passages, e.g., passage 216 indicated between the first panel 202a and the overlying skylight structure S, generally as in the exemplary cover 100 of FIGS. 1 and 2.

Each of the upper panels 202a through 202c includes a central ventilation passage 218a through 218c formed therethrough. The passages 218a through 218c preferably comprise the majority of each area subtended by each respective panel. However, the lowermost panel 202d is imperforate in order to block light passage therethrough. The upper surface of the lowermost panel 202d may have a reflective coating 210 thereon, if desired. There may be some diffuse and indirect light passage through the peripheral air or vent passages 216 between the panel 202a and the overlying skylight and between each of the panels 202a through 202c, but no harsh, direct light passage is permitted by this structure. The tiered multiple panels provide multiple levels of air or ventilation passages 216 therebetween, thus allowing greater airflow than the single panel embodiment 100 of FIGS. 1 and 2.

Figure 4:
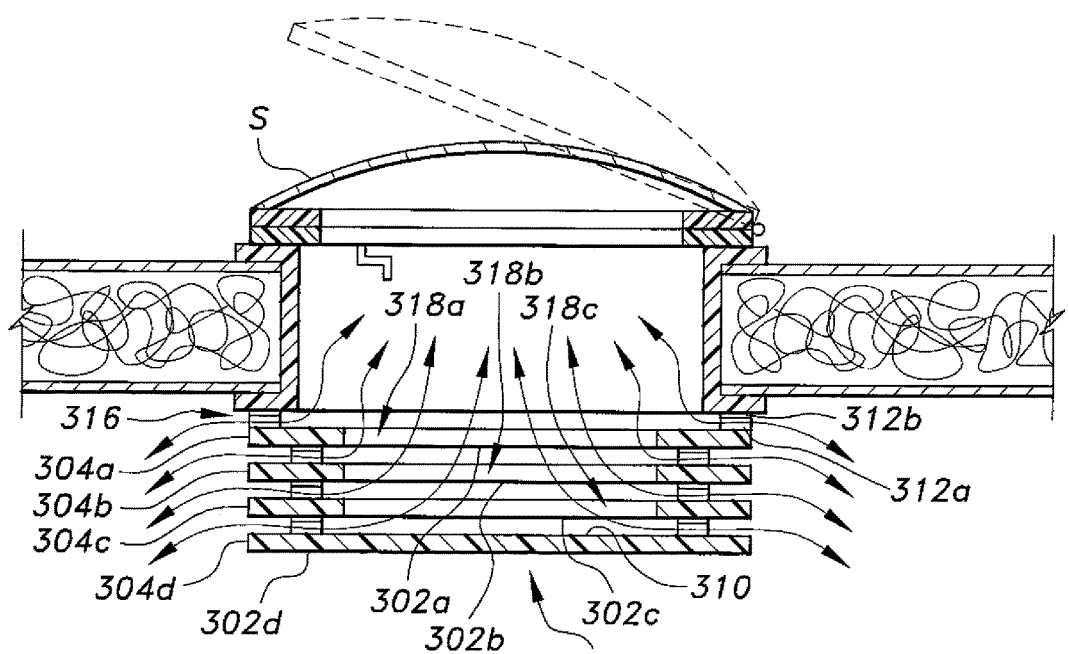
FIG. 4 is a side elevation view of a third embodiment of the skylight vent cover according to the present invention, wherein the vent cover comprises multiple panels of equal exterior dimensions.

FIG. 4 illustrates an elevation view in section of a third embodiment of a skylight vent cover 300. The vent cover 300 is quite similar to the vent cover 200 of FIG. 3, comprising multiple upper panels 302a through 302c and a lower panel 302d. However, it will be seen that all of the panels 302a through 302d have equal size peripheries 304a through 304d. This configuration serves to block or impede light passage to a greater extent than the tiered configuration of the embodiment 200 of FIG. 3, while also tending to spread airflow therethrough more laterally. As in other embodiments, the various panels 302a through 302d are secured to one another and to the overlying skylight vent structure S by mutually mating first and second fasteners or attachments. In the exemplary vent cover 300 of FIG. 4, the mating first and second attachments 312a and 312b comprise mutually attractive magnets.

Each of the upper panels 302a through 302c includes a central ventilation passage 318a through 318c formed therethrough. The passages 318a through 318c preferably comprise the majority of each area subtended by each respective panel. However, the lowermost panel 302d is imperforate in order to block light passage therethrough. The upper surface of the lowermost panel 302d may have a reflective coating 310 thereon, if desired.

Figure 5:
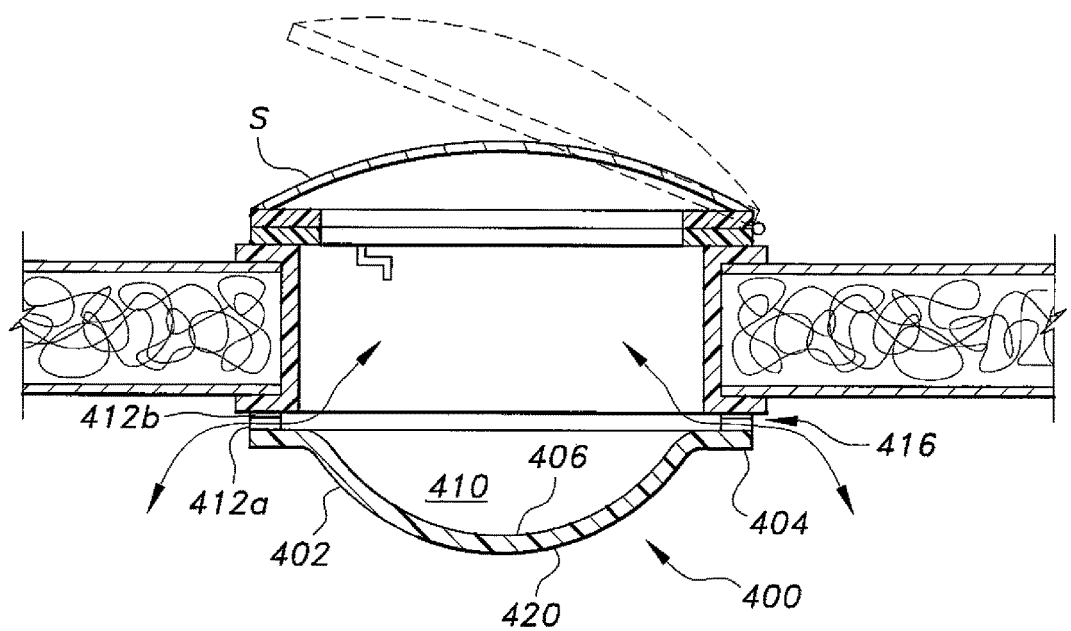
FIG. 5 is a side elevation view of a fourth embodiment of the skylight vent cover according to the present invention, wherein the vent cover comprises a single inverted dome-shaped panel.

FIG. 5 is an elevation view in section of a fourth embodiment of the skylight ventilation cover, designated as cover 400. The cover 400 includes only a single panel 402, as in the first embodiment cover 100 of FIGS. 1 and 2, but it will be seen in FIG. 4 that the panel 402 is non-planar and includes a downwardly oriented dome-shaped central portion 420 depending therebelow. Otherwise, the fourth embodiment skylight ventilation cover 400 of FIG. 5 is similar to the cover 100 of FIGS. 1 and 2, having a periphery 404 and a series of first attachments 412a attached to the upper surface 406 of the panel 402 adjacent the periphery 404. The upper surface 406 may include a reflective coating or surface 410 thereon, if desired. Second attachments 412b are installed upon the inner rim of the skylight structure S, to be in registry with the first attachments 412a of the panel 402 when the panel 402 is attached beneath the skylight S. As in other embodiments, the thickness or height of the two mating panel attachments 412a and 412b define a gap or space therebetween, which serves as an air or ventilation passage 416. The ability of the attachments 412a, 412b to be separated from one another allows the panel 402 to be removed from the overlying skylight structure S for cleaning and removal of any debris, dust, rainwater, etc. that might collect in the interior volume of the non-planar panel 402.

Figure 6:
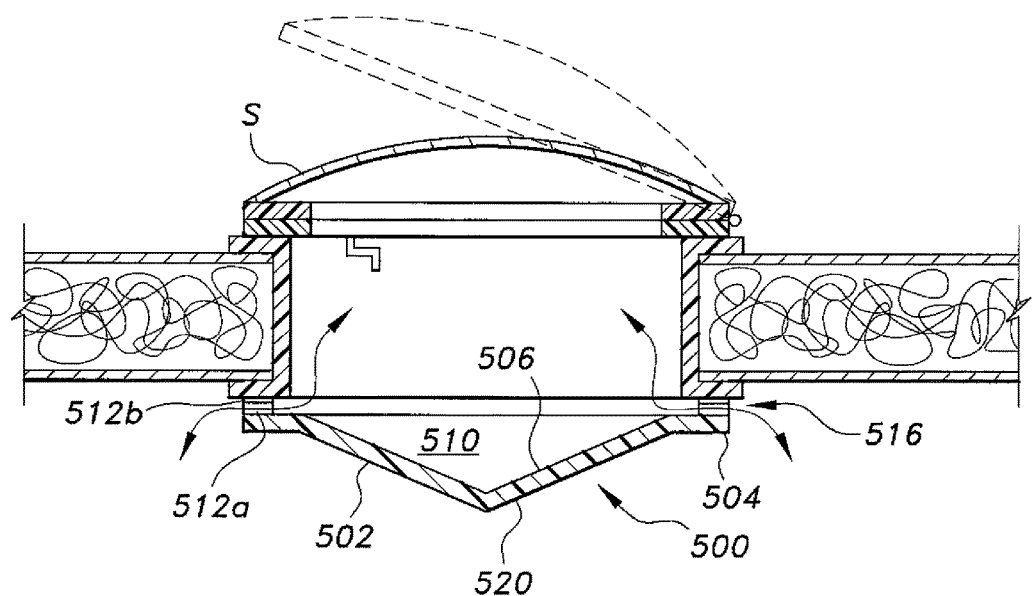
FIG. 6 is a side elevation view of a fifth embodiment of the skylight vent cover according to the present invention, wherein the vent cover comprises an inverted pyramid configuration.

FIG. 6 is an elevation view in section of a fifth embodiment of the skylight ventilation cover, designated as cover 500. The non-planar cover 500 is similar to the cover 400 of FIG. 5, i.e., having a downwardly oriented central portion 520 depending therebelow, but having an inverted pyramid or gable shape, rather than the inverted dome shape of the cover 400 of FIG. 5. Otherwise, the fourth embodiment skylight ventilation cover 500 of FIG. 6 is similar to the cover 400 of FIG. 5, having a periphery 504 and a series of first attachments 512a attached to the upper surface 506 of the panel 502 adjacent the periphery 504. The upper surface 506 may include a reflective coating or surface 510 thereon, if desired. Second attachments 512b (e.g., magnets, Velcro®, etc.) are installed upon the inner rim of the skylight structure S, to be in registry with the first attachments 512a of the panel 502 when the panel 502 is attached beneath the skylight S. As in other embodiments, the thickness or height of the two mating panel attachments 512a and 512b defines a gap or space therebetween, which serves as an air or ventilation passage 516. The ability of the attachments 512a, 512b to be separated from one another allows the panel 502 to be removed from the overlying skylight structure S for cleaning and removal of any debris, dust, rainwater, etc. that might collect in the interior volume of the non-planar panel 502, as in the case of the non-planar panel 402 of the embodiment of FIG. 5.

Figure 7:
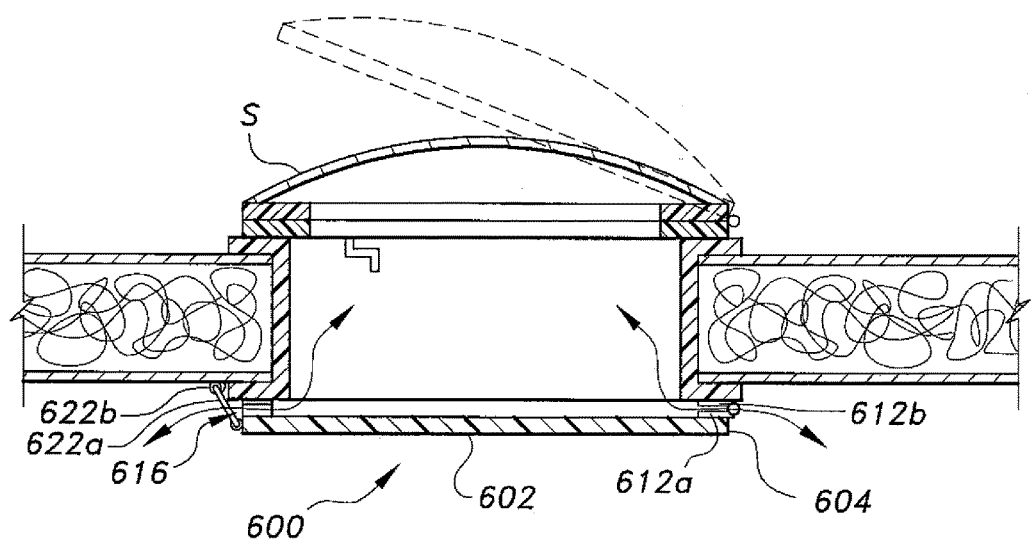
FIG. 7 is a side elevation view of a sixth embodiment of the skylight vent cover according to the present invention, wherein the vent cover is pivotally attached to the overlying skylight vent structure by a hinge.

FIG. 7 provides an elevation view in section of a sixth embodiment of the skylight vent cover, designated as cover 600. The cover 600 is similar to the cover 100 of the first embodiment of FIGS. 1 and 2, but is held in place by a different fastener or attachment mechanism. One of the first attachments 612a of the cover 600 comprises a first hinge leaf, and one of the second attachments 612b comprises a second hinge leaf pivotally attached to the first hinge leaf 612a. The hinge arrangement can be a plurality of relatively short hinges, or a longer, continuous hinge.

The opposite edge of the panel 602 is selectively latched to the corresponding edge of the skylight opening by additional first and second latch members 622a and 622b. The additional first latch member 622a can be a hook or the like pivotally attached to the periphery 604 of the panel 602, and the additional second latch member 622b may be a cooperating eye. This arrangement of a permanently attached hinge assembly 612a, 612b at one edge of the panel 602 and selective latch assembly 622a, 622b allows the panel 602 to be opened without being removed from the overlying skylight S.

It will be seen that various permutations and combinations of the above-described embodiments are possible. For example, the non-planar embodiments 400 of FIG. 5 and 500 of FIG. 6 can be constructed with multiple panels in the manner of the multiple panel embodiments 200 of FIG. 3 and 300 of FIG. 4. The lower surface of the lowermost panel, e.g., the single panel 102 of FIGS. 1 and 2 or the lowermost panel 202d of the embodiment of FIG. 3 or the lowermost panel 302d of the embodiment of FIG. 4 can be embellished with a decorative coating, artwork, pattern, scene, etc., if desired.

It is to be understood that the present invention is not limited to the embodiments described above, but encompasses any and all embodiments within the scope of the following claims.

I claim:

1. In combination, a selectively openable skylight structure attached to a structural entity and a skylight vent cover for installation beneath the skylight structure and within the structural entity for allowing airflow therethrough while blocking direct light passage, the skylight vent cover comprising:
   an opaque panel having a periphery;
   a plurality of first fasteners disposed adjacent the periphery of the panel; and
   a plurality of second fasteners disposed upon the overlying skylight structure, the first fasteners being in registry and mating with the second fasteners and separating the panel from the overlying skylight structure to define the air passage between the panel and the overlying skylight structure when the first and second fasteners are secured to one another.

2. The combination of a skylight structure and skylight vent cover according to claim 1, wherein the panel is non-planar and has a central portion depending therebelow.

3. The combination of a skylight structure and skylight vent cover according to claim 1, wherein the panel has an upper surface having a reflective coating disposed thereon.

4. The combination of a skylight structure and skylight vent cover according to claim 1, wherein said first fasteners and said second fasteners comprise mating hook and loop fasteners.

5. The combination of a skylight structure and skylight vent cover according to claim 1, wherein said first fasteners and said second fasteners comprise mating magnets.

6. The combination of a skylight structure and skylight vent cover according to claim 1, wherein:
   at least one of said first fasteners comprises a first hinge leaf;
   at least one of said first fasteners comprises a first latch member;
   at least one of said second fasteners comprises a second hinge leaf, the first hinge leaf and the second hinge leaf being pivotally connected to one another; and
   at least one of said second fasteners comprises a second latch member, the first latch member being selectively fastened to the second latch member.

7. In combination, a selectively operable skylight structure attached to a structural entity and a skylight vent cover for installation beneath the skylight and within the structural entity for allowing airflow therethrough while blocking direct light passage, the skylight vent cover comprising:
   at least one upper panel having a ventilation passage therethrough;
   an imperforate, opaque lower panel, each of the panels having an upper surface, a lower surface, and a periphery;
   a plurality of first fasteners disposed upon the upper surface and adjacent the periphery of each of the panels; and
   a plurality of second fasteners including a first set of second fasteners disposed upon the overlying skylight structure and a second set of second fasteners attached to the lower surface of the at least one upper panel adjacent the periphery, the first fasteners being in registry and mating with corresponding ones of the second fasteners and separating the panels from the overlying skylight structure and from one another to define a plurality of air passages between the panels and the overlying skylight structure when the first and corresponding second fasteners are fastened to one another.

8. The combination of a skylight structure and skylight vent cover according to claim 7, wherein each said panel is a rigid sheet.

9. The combination of a skylight structure and skylight vent cover according to claim 7, wherein each said upper panel is non-planar and has a central portion depending therebelow.

10. The combination of a skylight structure and skylight vent cover according to claim 7, wherein at least the lower panel has a reflective coating disposed upon the upper surface thereof.

11. The combination of a skylight structure and skylight vent cover according to claim 7, wherein said first and second fasteners comprise mating hook and loop fasteners.

12. The combination of a skylight structure and skylight vent cover according to claim 7, wherein said first and second fasteners comprise mating magnets.

13. The combination of a skylight structure and skylight vent cover according to claim 7, wherein:
- at least one of said first fasteners comprises a first hinge leaf;
- at least one of said first fasteners comprises a first latch member;
- at least one of said second fasteners comprises a second hinge leaf, the first hinge leaf and the second hinge leaf being pivotally connected to one another; and
- at least one of said second fasteners comprises a second latch member, the first latch member being selectively fastened to the second latch member.

14. In combination, a selectively openable skylight structure attached to a structural entity and a skylight vent cover for installation beneath the skylight and within the structural entity for allowing airflow therethrough while blocking direct light passage, the skylight vent cover comprising:
- a non-planar, opaque panel having a periphery and a central portion depending therebelow;
- a plurality of first fasteners disposed adjacent the periphery of the panel; and
- a plurality of second fasteners disposed upon the overlying skylight structure, the first fasteners being in registry and mating with the second fasteners and separating the panel from the overlying skylight structure to define an air passage between the panel and the overlying skylight structure when the first and second fasteners are secured to one another.

15. The combination of a skylight structure and skylight vent cover according to claim 14, wherein said panel is rigid.

16. The combination of a skylight structure and skylight vent cover according to claim 14, wherein said panel has an upper surface having a reflective coating disposed thereon.

17. The combination of a skylight structure and skylight vent cover according to claim 14, wherein said first fasteners and said second fasteners comprise mating hook and loop fasteners.

18. The combination of a skylight structure and skylight vent cover according to claim 14, wherein said first fasteners and said second fasteners comprise mating magnets.

19. The combination of a skylight structure and skylight vent cover according to claim 14, wherein:
- at least one of said first fasteners comprises a first hinge leaf;
- at least one of said first fasteners comprises a first latch member;
- at least one of said second fasteners comprises a second hinge leaf, the first hinge leaf and the second hinge leaf being pivotally connected to one another; and
- at least one of said second fasteners comprises a second latch member, the first latch member being selectively fastened to the second latch member.

20. The combination of a skylight structure and skylight vent cover according to claim 1, wherein said panel is rigid.

* * * * *